Sept. 12, 1950　　　A. W. GAUBATZ ET AL　　　2,522,443
COAXIAL COUNTER-ROTATING SHAFTS DRIVE
Filed Nov. 29, 1948　　　　　　　　　　　　　2 Sheets-Sheet 2

Inventors
Arthur W. Gaubatz &
John B. Wheatley
By Spencer, Willets, Helmig & Baillio
Attorneys Patented Sept. 12, 1950

2,522,443

UNITED STATES PATENT OFFICE 2,522,443

COAXIAL COUNTERROTATING SHAFTS DRIVE

Arthur W. Gaubatz and John B. Wheatley, Indianapolis, Ind., assignors to General Motors Corporation, Detroit, Mich., a corporation of Delaware Application November 29, 1948, Serial No. 62,466

5 Claims. (Cl. 74—801)

1

This invention relates to mechanisms for driving two coaxial shafts counter-rotatively from a single coaxial driving shaft, and particularly to such mechanisms designed to effect substantial and equal speed reductions between the driving and the respective driven shafts.

One of the objects of the invention is to provide an improved reduction drive mechanism of the type referred to employing a particularly compact arrangement of two gear systems driving the respective driven shafts from separate gears on the driving shaft.

A further object of the invention is to provide such a reduction drive mechanism employing two gear systems in parallel wherein the idler gear cage of one system and the orbit gear of the other system serve as stationary reaction elements and are secured together by a member disposed concentrically with and providing rotatable support for the driving and driven elements.

Figure 1:
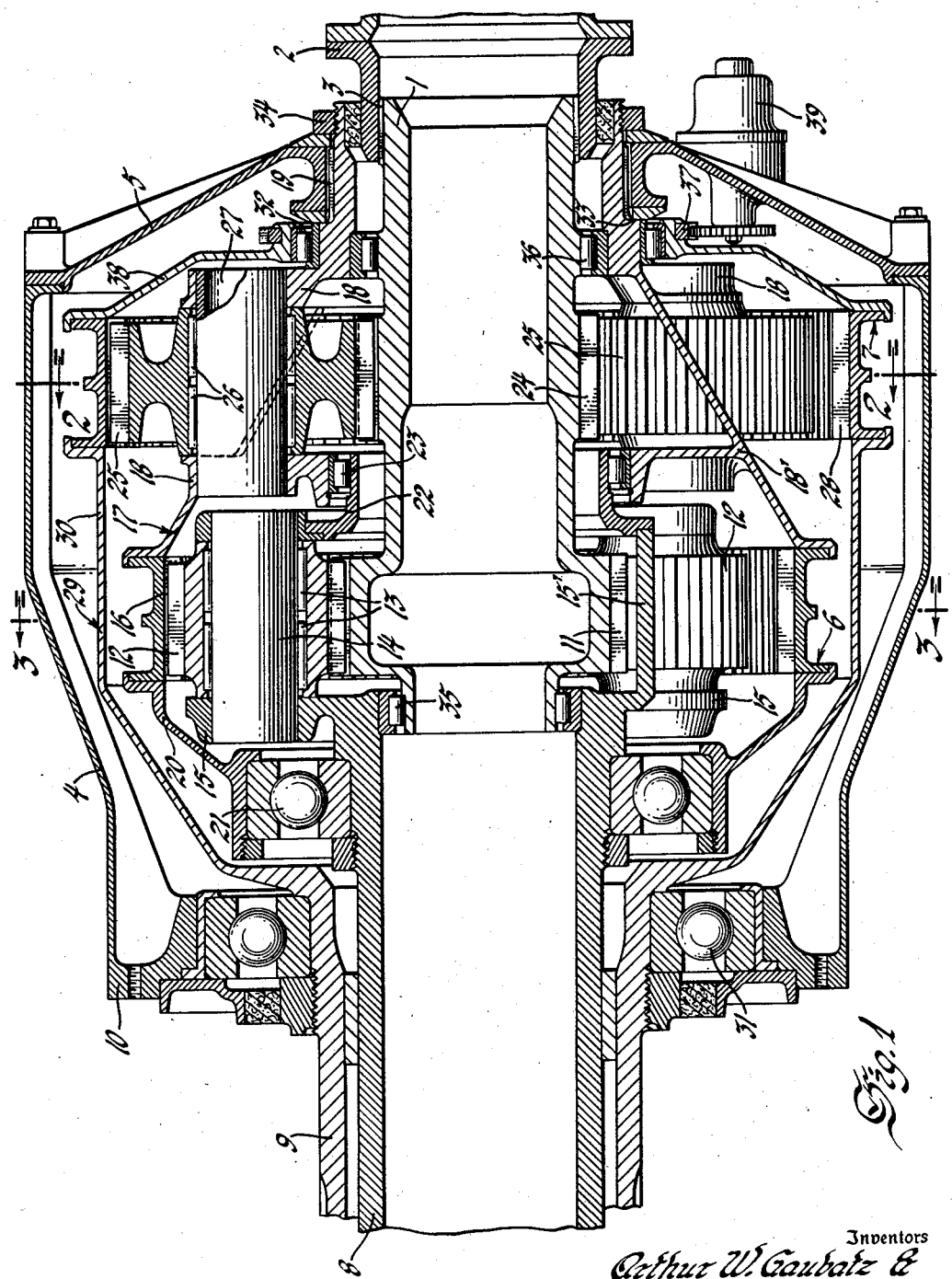

Other objects and advantages realized by the invention will become apparent from the following description, considered with reference to the drawings, in which:

Figure 1 is a longitudinal sectional view of a coaxial counter-rotating shafts drive embodying the features of the invention, certain parts being shown in elevation.

Figure 2:
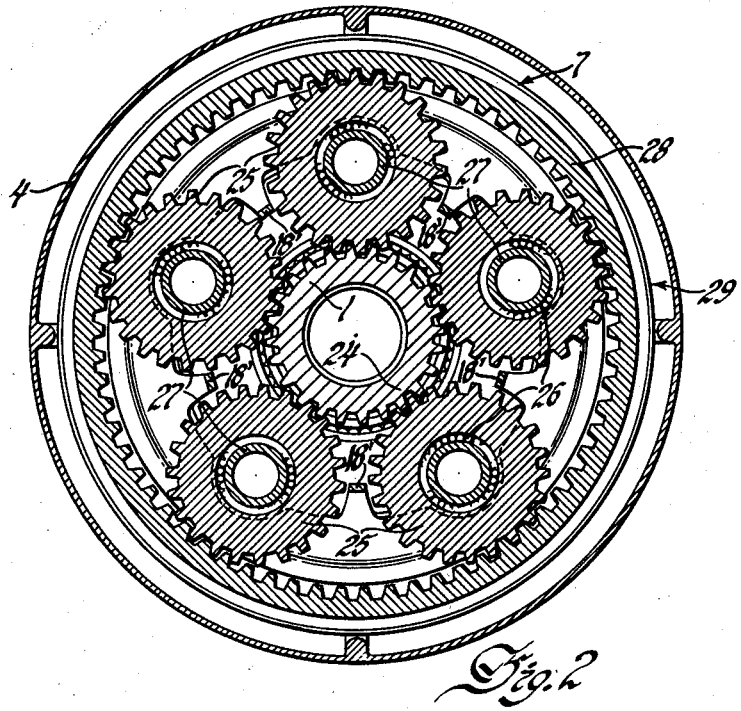
Figure 3:
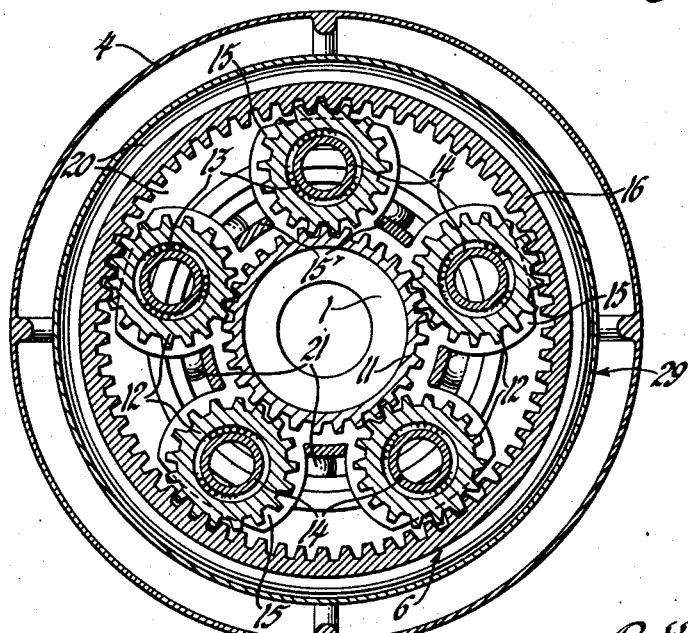

Figures 2 and 3 are sectional views thereof taken substantially on lines 2—2 and 3—3 of Figure 1, respectively.

As shown in the drawings the driving shaft 1, which may be an integral extension of the crankshaft or turbine shaft of an engine (not shown) or drivably connected thereto or to an extension 2 thereof as by the splined connection 3, extends into a stationary housing 4 through a centrally apertured end cover 5 thereon, and is drivably connected through two gear trains indicated generally by numerals 6 and 7 to two coaxial driven shafts 8 and 9, respectively, which extend into the housing 4 from the centrally apertured opposite end 10 thereof. The planetary gear train 6 includes a driving sun gear shown as an externally toothed pinion gear 11 integral with the driving shaft 1, a plurality of planet gears 12 journaled in roller bearings 13 on shafts 14 in a driven cage 15 shown as formed integrally with the inner driven shaft 8, and a reaction orbit gear shown as an internally toothed gear 16 which is non-rotatably anchored to a fixed inner drum member 17. As shown in the drawings, the portions of the cage section 15 at opposite

2 ends of the planet gears 12 are interconnected by integral bracing members or struts 15'.

Drum member 17 comprises a section 18, which forms the cage for the idler gears 25 of the gear train 7 and is splined as at 19 or otherwise non-rotatably anchored to the housing end cover 5, and an extension 20 which rotatably supports the inner driven shaft 8 both radially and in thrust through a bearing 21 adjacent one side of the planet gear cage 15. The other side of the gear cage 15 is also radially supported through an L-section ring 22 which is secured thereto as by a pressed fit and which forms the inner race of a roller bearing 23 between it and the fixed gear cage section 18 of the drum member 17. As shown in the drawings, the portions of the cage section 18 at opposite ends of the idler gears 25 are interconnected by integral bracing members or struts 18'. The drum member 17 is anchored end-wise to the housing 4 in any desired manner, as by providing the section 18 thereof with a shoulder 33 and a threaded nut 34 at opposite ends of its splined connection 19 with the housing end cover 5.

The gear train 7 includes a driving gear shown as an externally toothed pinion gear 24 integral with the driving shaft 1 and axially adjacent the driving sun gear 11 thereon, a plurality of idler gears 25 journaled in roller bearings 26 on shafts 27 in the fixed cage section 18 of the drum member 17, and a driven gear shown as an internally toothed gear 28 drivably connected to an outer drum member 29. The outer drum member 29 comprises a section 30 integral with or otherwise fixedly secured to the outer driven shaft 9, with which it is rotatably supported both radially and in thrust in the housing end 10 through a bearing 31, and an extension 38 which provides a rotatable support on the fixed cage section 18 for the other side of the internal gear 28 through a roller bearing 32. The extension 38 may also carry an accessory drive gear 37 for driving an oil pump 39 or the like.

The driving shaft 1 is rotatably supported at one end by the inner driven shaft 8 through a roller bearing 35 and adjacent its other end by the fixed inner drum member 17 through a roller bearing 36.

In operation, as the driving shaft 1 rotates in one direction the inner driven shaft 8 rotates at a reduced speed in the same direction due to the internal gear 16 being held stationary, and the outer driven shaft 9 rotates at a reduced speed in the opposite direction on account of the idler gear cage 18 being held stationary, The use of two gear systems for driving the respective driven shafts in the arrangement heretofore described effects a substantial shortening and decrease in overall diameter of the reduction drive over that of the conventional prior art devices designed for the same gear tooth pressures and employing a compound dual rotation planetary system. It will also be noted in the drive assembly illustrated that all of the relatively rotating members are well supported in bearings on the stationary members, thereby obtaining the concentric alignment necessary for good tooth contact and long wear.

We claim:

1. In a speed reduction drive for counter-rotating shafts driven by a single coaxial driving shaft; a housing having aligned openings at opposite ends thereof; a driving shaft extending into the housing through one of said openings; inner and outer driven shafts extending into the housing through the other of said openings coaxially with the driving shaft, gear trains drivably connecting the driving shaft with the inner and outer driven shafts respectively, each of said trains including a first gear drivably carried by the driving shaft, a plurality of second gears in constant mesh therewith, a cage for the second gears and an internal gear in constant mesh with the second gears; an inner drum within the housing and fixed thereto adjacent the opening through which the driving shaft extends, said inner drum having the internal gear of one of the trains and the cage of the other train fixed thereto; and an outer drum within the housing and drivably carrying the internal gear of said other train, said outer drum being drivably carried by the outer driven shaft and rotatably supported at its opposite ends by the housing and the inner drum respectively; said inner driven shaft drivably carrying the cage of said one train and being rotatably supported on each side thereof by the inner drum; said driving shaft being rotatably supported adjacent said one train by the inner driven shaft and rotatably supported adjacent the other train by the inner drum.

2. In a speed reduction drive for counter-rotating shafts driven by a single coaxial driving shaft, two coaxial driven shafts, a driving shaft coaxial therewith, two gear sets drivably connecting the driving shaft with the respective driven shafts, a fixed drum member enclosing one of said gear sets and forming an idler gear cage for the other of said gear sets, and a driven drum member formed integral with one of the driven shafts and enclosing both of said gear sets, said gear set enclosed by the fixed drum member including an internal orbit gear fixed thereto and a planet gear cage fixed to the other of said driven shafts, and the other of said gear sets including an internal gear fixed to the driven drum member, said other driven shaft being rotatably supported independently of said one driven shaft and on oposite sides of said one gear set by said fixed drum member.

3. In a speed reduction drive for counter-rotating shafts driven by a single coaxial driving shaft, a housing, a driving shaft within the housing including two axially adjacent external gears, an inner driven shaft extending into the housing drivably carrying a planet gear cage in operative relationship with one of the external gears, a fixed inner drum member including an internal gear in operative relationship with said planet gear cage and an idler gear cage in operative relationship with the other of said external gears, and an outer driven shaft extending into the housing and drivably carrying an outer drum member including an internal gear in operative relationship with said idler gear cage, opposite ends of said outer drum being journaled on the housing and inner drum respectively and opposite ends of said planet gear cage being journaled on the inner drum.

4. In a speed reduction drive; a supporting housing; a driving shaft extending into one end of the housing; concentric driven shafts extending into the opposite end of the housing in alignment with the driving shaft; two gear trains drivably connecting the driving shaft with the respective inner and outer driven shafts; each of said gear trains including a pinion directly connected to the driving shaft, a set of gears in mesh with the pinion, a carrier for said set of gears and an internal gear in mesh with the gears of said set; a member fixed to the housing and anchoring the carrier of one train and the internal gear of the other train against rotation; said inner and outer driven shafts having portions connecting them for rotation with the carrier of said other train and the internal gear of said one train, respectively; said inner driven shaft portion being journaled on the member adjacent opposite ends of the pinion of said other gear train; said outer driven shaft portion being journaled on the housing adjacent said opposite end thereof and journaled on the member adjacent said one end of the housing.

5. In a speed reduction drive; a supporting housing; a driving shaft extending into one end of the housing; concentric driven shafts extending into the opposite end of the housing in alignment with the driving shaft; two gear trains drivably connecting the driving shaft with the respective inner and outer driven shafts; each of said gear trains including a pinion directly connected to the driving shaft, a set of gears in mesh with the pinion, a carrier for said set of gears and an internal gear in mesh with the gears of said set; a member fixed to the housing and anchoring the carrier of one train and the internal gear of the other train against rotation; said inner and outer driven shafts having portions connecting them for rotation with the carrier of said other train and the internal gear of said one train, respectively; said member rotatably supporting said inner driven shaft portion both between the gear trains and adjacent said opposite end of the housing; opposite ends of said outer driven shaft portion being rotatably supported by the housing and member adjacent said opposite and said one end of the housing, respectively.

ARTHUR W. GAUBATZ.
JOHN B. WHEATLEY.

REFERENCES CITED

The following references are of record in the file of this patent:

UNITED STATES PATENTS

| Number | Name | Date |
|---|---|---|
| 2,228,638 | Mercier | Jan. 14, 1941 |

FOREIGN PATENTS

| Number | Country | Date |
|---|---|---|
| 541,820 | Great Britain | Dec. 12, 1941 |